United States Patent
Anderson et al.

[11] Patent Number: 5,941,207
[45] Date of Patent: Aug. 24, 1999

[54] DIRECT INJECTION SPARK IGNITION ENGINE

[75] Inventors: Richard Walter Anderson, Ann Arbor; Jianwen Yi; Jialin Yang, both of Canton, all of Mich.

[73] Assignee: Ford Global Technologies, Inc., Dearborn, Mich.

[21] Appl. No.: 08/925,131

[22] Filed: Sep. 8, 1997

[51] Int. Cl.$^6$ .................................................. F02B 17/00
[52] U.S. Cl. .............................................................. 123/295
[58] Field of Search ...................................... 123/295, 305

[56] References Cited

U.S. PATENT DOCUMENTS

| | | |
|---|---|---|
| 2,183,284 | 12/1939 | Wiebicke . |
| 2,914,257 | 11/1959 | Wiant . |
| 2,915,257 | 11/1959 | Wiant . |
| 3,195,520 | 7/1965 | Simko . |
| 3,294,072 | 12/1966 | Simko et al. . |
| 3,315,650 | 4/1967 | Bishop et al. . |
| 3,838,821 | 10/1974 | Berlyn . |
| 4,006,719 | 2/1977 | Kanda et al. . |
| 4,186,708 | 2/1980 | Bowler . |
| 4,318,377 | 3/1982 | Occella et al. . |
| 4,372,264 | 2/1983 | Trucco . |
| 4,389,986 | 6/1983 | Tanasawa . |
| 4,394,963 | 7/1983 | Iwata . |
| 4,413,780 | 11/1983 | Skinner et al. . |
| 4,574,754 | 3/1986 | Rhoades, Jr. . |
| 4,685,432 | 8/1987 | Saito et al. . |
| 4,753,213 | 6/1988 | Schlunke et al. . |
| 4,788,942 | 12/1988 | Pouring et al. ............................ 123/295 |
| 5,078,107 | 1/1992 | Morikawa . |
| 5,086,737 | 2/1992 | Watanabe et al. ........................ 123/295 |
| 5,322,043 | 6/1994 | Shriner et al. ............................ 123/295 |
| 5,522,357 | 6/1996 | Nogi et al. ................................ 123/295 |
| 5,553,579 | 9/1996 | Yoshida et al. . |
| 5,709,190 | 1/1998 | Suzuki . |
| 5,722,362 | 3/1998 | Takano et al. ............................ 123/295 |

FOREIGN PATENT DOCUMENTS 2148394   5/1985   United Kingdom .

Primary Examiner—John Kwon
Attorney, Agent, or Firm—Neil P. Ferraro

[57] ABSTRACT

A stratified charge is formed in a direct injection engine by injecting fuel at a predetermined velocity, a predetermined droplet size, and forming the injected fuel with a hollow cone having a predetermined initial cone angle. The injected fuel thereby shallowly penetrates the combustion chamber so as to float therein to reduce wall-wetting and subsequent soot formation. A substantially flat top piston forms the injected fuel into a ball-shaped kernel during a compression stroke of the engine. The ball-shaped kernel remains substantially unmixed with the inducted air, thereby producing the stratified charge. The continued motion of the piston causes the ball-shaped kernel to move toward the spark plug for ignition.

28 Claims, 3 Drawing Sheets

DIRECT INJECTION SPARK IGNITION ENGINE

FIELD OF THE INVENTION

The present invention relates to direct injection engines and more particularly to, forming a stratified charge in such engines.

BACKGROUND OF THE INVENTION

Direct injection engines are aimed at improving fuel economy at low engine loads by providing a stratified charge in the combustion chamber. A stratified charge engine is one in which the combustion chamber contains stratified layers of different air/fuel mixtures. The strata closest to the spark plug contains a mixture slightly rich of stoichiometry, and subsequent strata contain progressively leaner mixtures. The overall air/fuel mixture within the combustion chamber is lean of stoichiometry, thereby improving overall fuel economy at low loads. At high engine loads, typically greater than 50% of full engine load, a homogeneous air-fuel mixture is provided in the combustion chamber.

Conventional direct injection engines typically include a piston having a depression in the top face thereof (typically referred to as a bowl) and a swirl or tumble control valve located in the intake port to produce a swirl or tumble of the air entering the combustion chamber. As fuel is injected into the combustion chamber, the fuel impinges against the bottom of the bowl and cooperates with the motion of the air in the chamber to produce the stratified charge, with the richest portion of the charge moving toward the ignition source.

The inventors of the present invention have recognized certain disadvantages with these prior art engines. For example, because the fuel sprayed from the fuel injector is directed toward the piston bowl, it is likely that a portion of the fuel will stick to the piston surface causing an undesirable wall-wetting condition. As the remainder of the fuel is burned, the flame propagating toward the piston surface is unable to completely burn the liquid fuel film on the piston surface. This results in undesirable soot formation during combustion.

In addition, because the design of these engines relies on the fuel impinging against the bowl and subsequently directed toward the spark plug, fuel injection timing is of a major concern. In direct injection engines, fuel injection is a function of time whereas the motion of the piston is a function of crank angle. In port injected engines, fuel entering the chamber is a function of crank angle because the opening of the intake valve is a function of crank angle. As a result, it is imperative to control the timing of fuel injection in a direct injection engine so that the injected fuel may impinge on the bowl at the proper time and the fuel cloud may move toward the spark plug. In other words, if the fuel is injected too early, the spray may miss the bowl entirely, thereby not deflecting toward the spark plug. If the fuel is injected too late, then excess wall-wetting may occur.

Further, the inventors of the present invention have found that with bowl-in-piston engines, switching between a stratified charge and a homogeneous charge occurs at part loads ranging between 30% to 40% of full engine load. As the engine load increases, more fuel is required. However, because of the physical limitations of the bowl (i.e. the size of the bowl relative to the size of the combustion chamber), the amount of fuel that can be placed in the bowl and still attain a stratified charge is limited. Otherwise, the potential for wall wetting and subsequent soot formation may increase. As a result, above about 40% of full engine load, fuel economy is compromised.

Other disadvantages with prior art engines results in a heavier piston, increased engine height to accommodate the larger piston, a larger combustion chamber surface to volume ratio, more heat loss, and increased charge heating during the intake and compression strokes, which increases the tendency for engine knocking.

SUMMARY OF THE INVENTION

An object of the present invention is to provide a direct injection spark ignition engine which overcomes the disadvantages of prior technology. This object is achieved, and disadvantages of prior art approaches overcome, by providing a method of forming a stratified charge mixture for a direct injection spark ignition internal combustion engine. The engine has a cylinder block with a cylinder bore formed therein. The cylinder bore defines a longitudinal axis. A flat top piston is reciprocally housed within the cylinder bore and a cylinder head is attached to the block to close the top end of the bore to form a combustion chamber. An intake port is formed in the cylinder head and communicates with the combustion chamber via an intake valve for introducing air into the chamber. A fuel injector, which defines an axis and communicates with the combustion chamber, supplies fuel directly into the combustion chamber. An ignition source communicates with the combustion chamber and ignites fuel within the chamber. In one particular aspect of the invention, the method includes the steps of injecting fuel from the fuel injector into the combustion chamber at a predetermined velocity and with a predetermined droplet size. The injected fuel is formed with a hollow fuel cone having a predetermined initial cone angle. The injected fuel thereby shallowly penetrates into the combustion chamber so as to float therein to reduce wall-wetting. The method also includes the step of forming the fuel cone into a substantially ball-shaped kernel with the substantially flat top piston during a compression stroke of the engine. Thus, the fuel remains substantially unmixed with the inducted air, thereby producing the stratified charge. The ball-shaped kernel is then moved toward the ignition source for ignition.

An advantage of the present invention is that wall-wetting on the piston surface is reduced.

Another, more specific, advantage of the present invention is that a near complete combustion occurs with little or no soot formation.

Yet another advantage of the present invention is that a less complex engine is provided in that no bowl is required for the piston.

Another advantage of the present invention is that little or no swirl or tumble motion of intake air is required.

Still another advantage of the present invention is that regulated emissions may be reduced.

Another advantage of the present invention is that the engine load range in which a stratified charge may be produced is extended.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
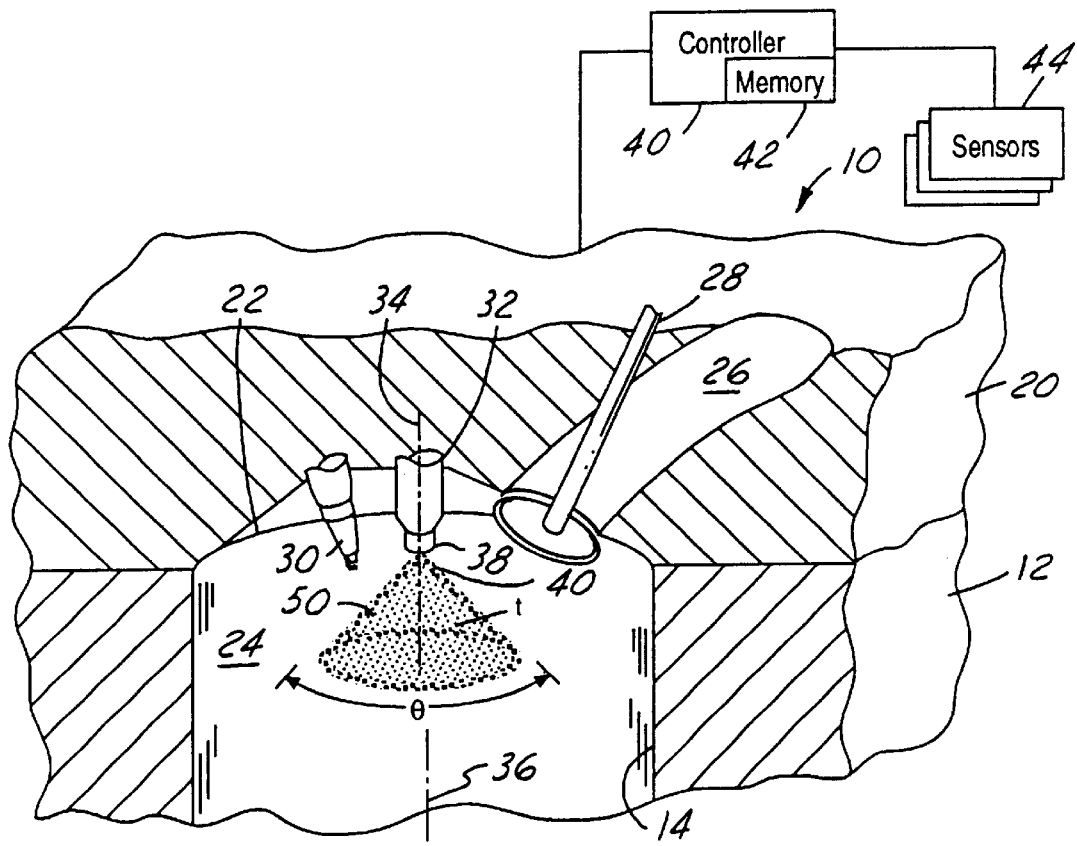
FIGS. 1 and 2 are a diagrammatic cross-sectional representations of a direct injection engine according to the present invention.
Figure 2:
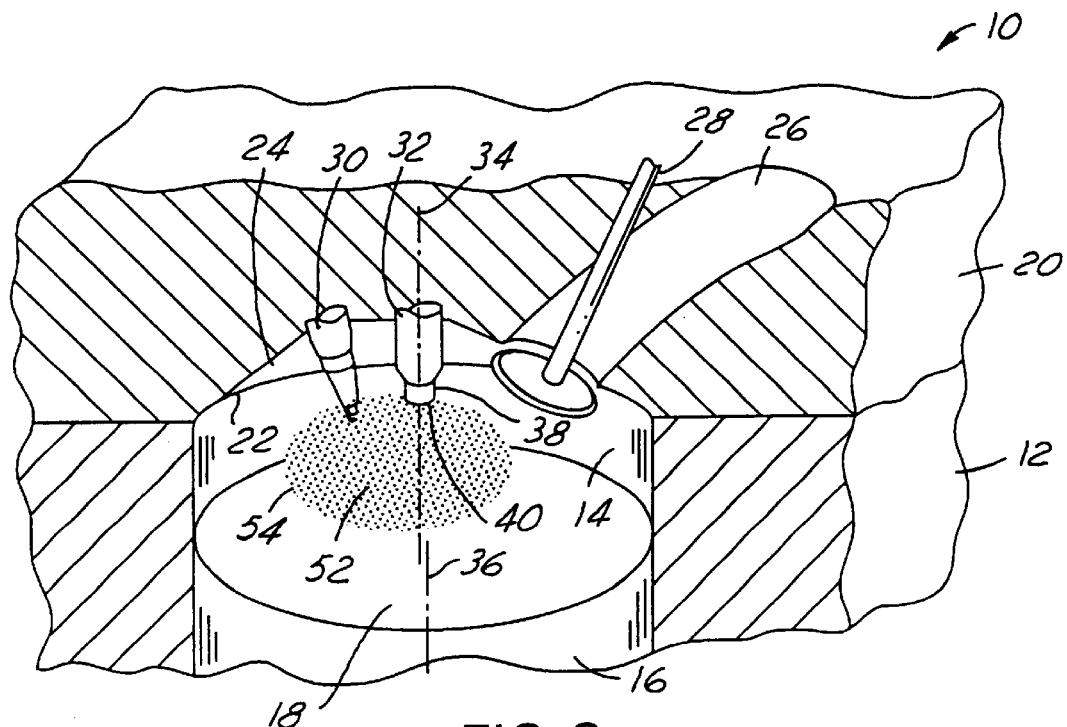

Internal combustion engine 10, shown in FIGS. 1 and 2, includes cylinder block 12, having cylinder bore 14 formed therein and piston 16 reciprocally housed within bore 14. Piston 16 has a substantially flat top 18. Cylinder head 20 is attached to block 12 and encloses top end 22 of bore 14 to form combustion chamber 24. Engine 10 is a multi-valve engine having, for example, two intake ports and two exhaust ports. For the sake of clarity, only one intake port 26 is shown and is formed within cylinder head 20 and communicates with combustion chamber 24 through intake valve 28. According to the present invention, intake port 26 is a conventional intake port providing substantially no swirl or tumble motion of intake air within combustion chamber 24, although deactivation of one of the intake valves may produce some swirl motion. Engine 10 also includes spark plug 30 communicating with combustion chamber 24 for igniting an air/fuel mixture within combustion chamber 24. Engine 10 further includes fuel injector 32 defining axis 34 for injecting fuel directly into combustion chamber 24. In the example described herein, injector 32 is generally located along axis 36 of cylinder 14. However, injector 32 need not be coincident with axis 36. In fact, injector 32 may be mounted on the side of cylinder 14, typically referred to as a side mounted injector, whereas in the example shown, injector 32 is a centrally mounted injector. Injector 32 includes tip 36 having an orifice 38 for injecting fuel from a fuel system (not shown) to combustion chamber 24.

Engine 10 further includes controller 40 (see FIG. 1) having memory storage device 42. A plurality of sensors 44 sense numerous engine operating parameters such as engine speed, engine load, spark timing, EGR rate, fuel delivery rate, engine air charge temperature, engine coolant temperature, intake manifold absolute pressure, the operating position of the throttle, vehicle gear selection, vehicle speed, intake manifold air mass flow rate, accelerator position, and other parameters known to those skilled in the art and suggested by this disclosure.

According to the present invention, fuel injector 32 injects fuel into the combustion chamber 24 at a predetermined velocity along axis 34 of injector 32 and at a predetermined droplet size. Fuel is injected during the compression stroke at about 80° before top dead center. The injected fuel is formed into a hollow cone 50 (see FIG. 1) having a predetermined initial cone angle θ. Accordingly, the injected fuel shallowly penetrates into combustion chamber 24 so as to float therein to reduce wall-wetting. As piston 16 progressively compresses the air within combustion chamber 24 during the compression stroke, fuel cone 50 is progressively formed into a substantially ball-shaped kernel 52 (see FIG. 2) by the action of the substantially flat top piston 16. The fuel thereby remains substantially unmixed with air inducted through intake port 26, thereby producing the stratified charge in combustion chamber 24. Further, the piston motion causes the ball-shaped kernel 52 to engulf the spark plug 30 so that the fuel may be ignited.

In a preferred embodiment, the droplet size, as measured by the Sauter Mean Diameter method, is between about 8 μm and about 10 μm. The injection velocity of the fuel entering into the combustion chamber is between about 9 m/s and about 12.5 m/s, as measured along axis 34 of injector 32. Also, the initial cone angle θ of fuel cone 50 is between about 80° and about 100°, and preferably 90°.

Figure 3:
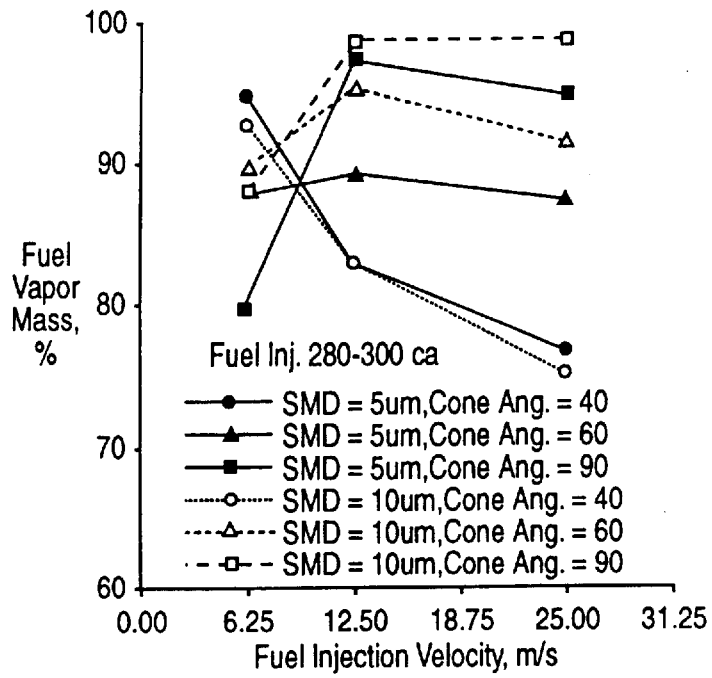
FIGS. 3–5 are graphs showing the characteristics of the stratified charge in the engine according to the present invention; and, FIGS. 6 and 7 are diagrammatic representations of alternative fuel injectors according to the present invention.
Figure 4:
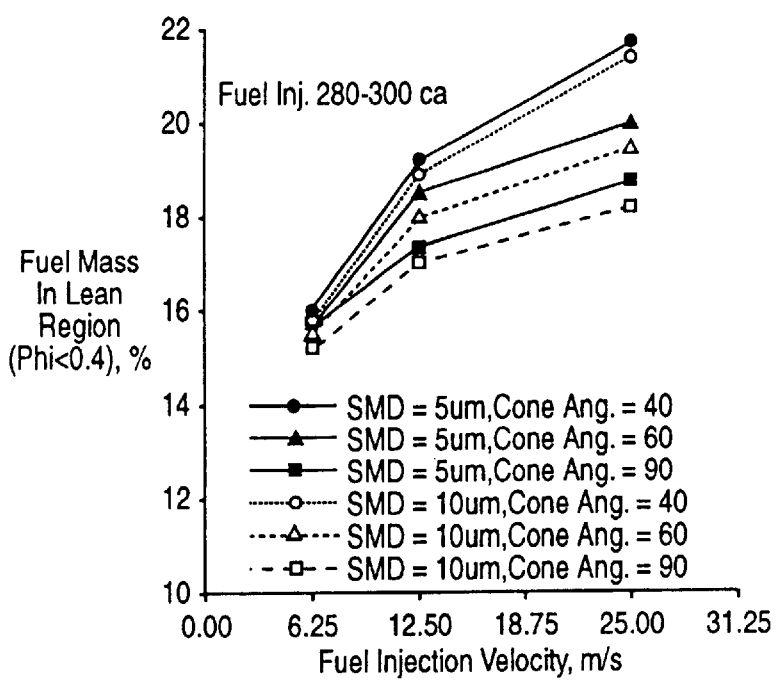
Figure 5:
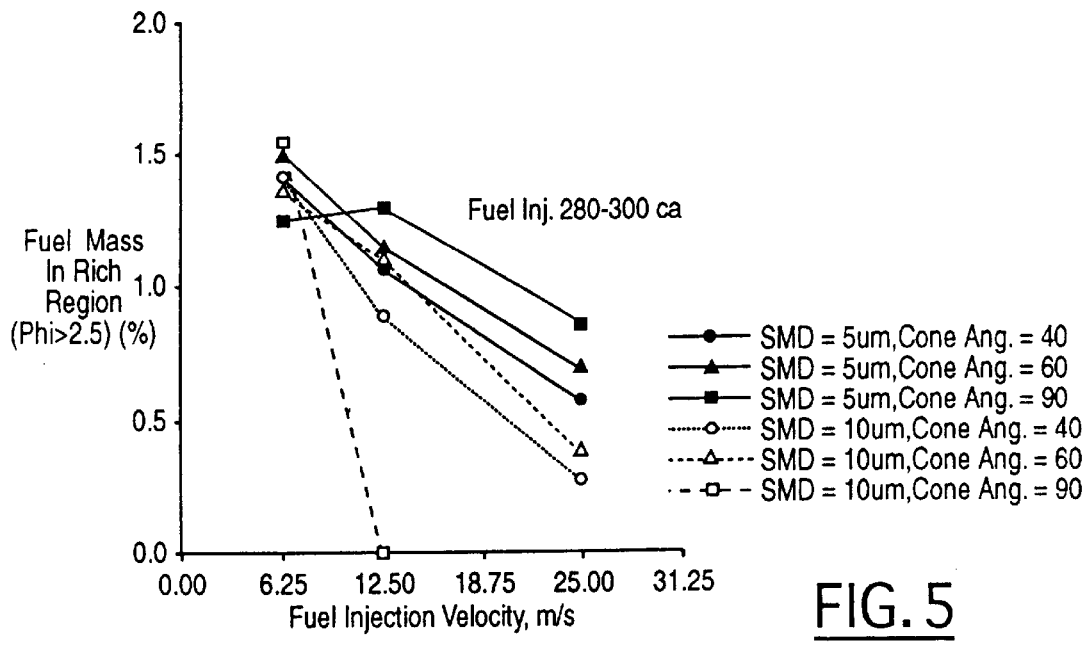

The effects of having such a shallowly penetrating fuel injected from fuel injector 34 is clearly shown in the graphs of FIGS. 3–5. In FIG. 3, a plot of fuel vapor mass versus fuel injection velocity at various cone angles and droplet diameters is shown. At a fuel injection velocity of about 12.5 m/s, it is clearly shown that, with a droplet diameter of about 10 μm and a cone angle θ of about 90°, over 95% of the injected fuel is vaporized at the time of ignition. This is a highly desirable result to avoid wall-wetting of either the piston surface 18 or the wall of cylinder 14.

Referring now to FIG. 4, it is shown that a sharp boundary 54 between the rich region and lean region may be obtained according to the present invention. FIG. 4 is a plot of fuel mass in the lean region at the time of ignition versus fuel injection velocity, wherein the lean region is defined by the fuel-air equivalence ratio phi being less than about 0.4. Phi is defined as the stoichiometric air/fuel ratio of 14.6 to 1 divided by the desired air/fuel ratio in the lean region. Thus, in this example, the lean region has an air/fuel ratio of anything greater than 36.5, which is 14.6 divided by 0.4. Continuing with reference to FIG. 4, at a fuel injection velocity of about 12.5 m/s and a droplet diameter of about 10 μm with a cone angle θ of about 90°, it can be seen that the amount of fuel in the lean region is less than about 17%. This is highly desirable to create a stratified charge, with the richest portion of the charge nearest spark plug 30.

Referring now to FIG. 5, a graph of the amount of fuel mass in the rich region, where phi is greater than 2.5, upon combustion of the air/fuel mixture is shown. Fuel mass of phi greater than 2.5 results in a high probability of soot formation. At a fuel injection velocity of about 12.5 m/s and a droplet diameter of about 10 μm with a cone angle θ of about 90°, it is seen there is substantially no fuel in the rich region and consequently no soot is formed.

According to the present invention, controller 40 controls a switch point for switching between a stratified charge produced in combustion chamber 24, as described above, and a homogeneous charge. Those skilled in the art will recognize in view of this disclosure that changing between a stratified charge and a homogeneous charge may be accomplished by changing injection timing from the compression stroke to the intake stroke, for example. The switch point occurs at a point greater than about 50% of full engine load, and, more desirably, at a point between about 60% and about 70% of full engine load. This is due to the fact that a stratified charge may be produced in combustion chamber 24, as described above, with a relatively large amount of fuel being delivered therein without the potential for wall wetting and subsequent soot formation because the charge is not constrained by a bowl formed in piston surface 18 of a limited volume, but rather is constrained by the entire volume of combustion chamber 24.

Figure 6:
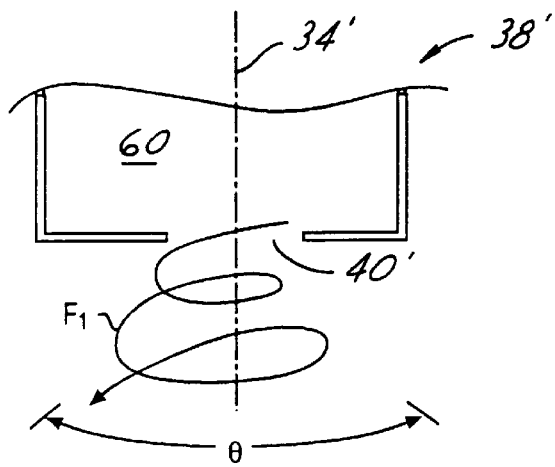
Figure 7:
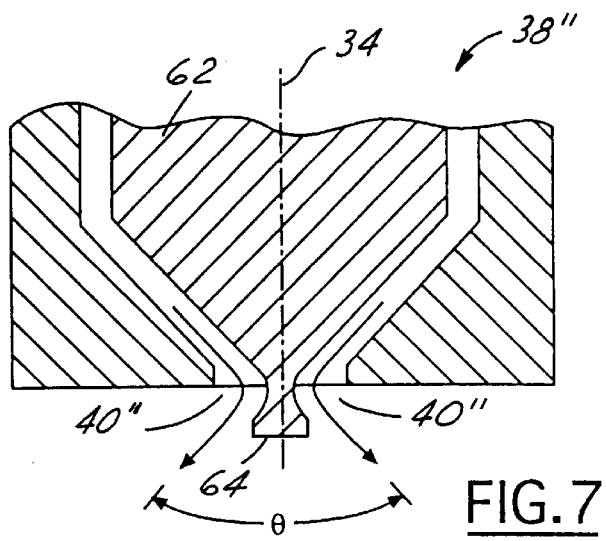

Those skilled in the art will recognize in view of this disclosure that, to form such a low penetration fuel injection as previously described, a swirl injector or an injector having a deflector in its tip may be used, as shown in FIGS. 6 and 7, respectively. FIG. 6 shows injector tip 38' having a swirl chamber 60 causing a swirling motion of fuel, shown as arrow $F_1$. The swirling fuel necessarily forms a hollow cone with the size of orifice 40' cooperating with the function of the swirl chamber 60 to produce the desired droplet size, injection velocity and initial cone angle θ.

Turning now to FIG. 7, injector tip 38" is formed with pintle 62 having deflector 64 formed thereon. Deflector 64 is designed to properly define a hollow cone with an initial cone angle θ, as previously described. In addition, orifice size 40" is sized to produce the previously described desired droplet size.

While the best mode for carrying out the invention has been described in detail, those skilled in the art to which this invention relates will recognize various alternative designs and embodiments, including those mentioned above, in practicing the invention that has been defined by the following claims.

We claim:

1. A method of forming a stratified charge mixture for a direct injection, spark ignition internal combustion engine, the engine having a cylinder block with a plurality of cylinder bores formed therein, the cylinder bore defining a longitudinal axis, a plurality of substantially flat top pistons each reciprocally housed within a cylinder bore, a cylinder head attached to the block and closing top ends of the bores to form a plurality of combustion chambers, an intake port formed in the cylinder head and communicating with the combustion chamber via an intake valve for introducing air into the combustion chamber, a fuel injector, defining an axis and communicating with the combustion chamber, for supplying fuel directly into the combustion chamber, and an ignition source communicating with the combustion chamber for igniting fuel within the combustion chamber, with said method comprising the steps of:

injecting fuel from the fuel injector into the combustion chamber at a predetermined velocity and with a predetermined droplet size and forming said injected fuel with a hollow fuel cone having a predetermined initial cone angle, with said injected fuel thereby shallowly penetrating the combustion chamber so as to float therein to reduce wall wetting;

forming said injected fuel into a substantially ball shaped kernel with said substantially flat top piston during a compression stroke of the engine, with said fuel remaining substantially unmixed with said inducted air, thereby producing said stratified charge; and moving said ball shaped kernel toward said ignition source.

2. A method according to claim 1 wherein said predetermined droplet size is between about 8 μm and about 10 μm.

3. A method according to claim 1 wherein said predetermined velocity is between about 9 m/s and about 12.5 m/s along the axis of the fuel injector.

4. A method according to claim 1 wherein said predetermined initial cone angle is between about 80° and about 100°.

5. A method according to claim 1 wherein an amount of fuel vaporized into said ball shaped kernel relative to the amount of fuel injected is greater than about 95%.

6. A method according to claim 1 wherein said ball shaped kernel defines a relatively rich region and the remainder of the volume of the combustion chamber defines a lean region and wherein an amount of fuel penetrating into said lean region is less than about 17%.

7. A method according to claim 1 further comprising the step of switching between a stratified charge and a homogeneous charge, with said switching occurring at an engine load of greater than about 50% of full engine load.

8. A method according to claim 7 wherein said switching occurs at an engine load between about 60% and about 70% of full engine load.

9. A stratified charge, direct injection, spark ignition internal combustion engine comprising:

a cylinder block;

a cylinder bore formed in said cylinder block, with said bore defining a longitudinal axis and having a top end;

a cylinder head attached to said block and closing said top end of said bore to form a combustion chamber;

an intake port formed in said cylinder head and communicating with said combustion chamber via an intake valve for inducting air into said combustion chamber;

a fuel injector, defining an axis, for injecting fuel directly into said combustion chamber, with said injected fuel having a predetermined velocity, a predetermined droplet size, and formed into a hollow cone having a predetermined initial cone angle, with said injected fuel thereby shallowly penetrating into said combustion chamber so as to float therein to reduce wall wetting;

a substantially flat top piston reciprocally housed within a said bore, with said substantially flat top piston causing said injected fuel to form into a substantially ball shaped kernel during a compression stroke of the engine, with said fuel remaining substantially unmixed with said inducted air, thereby producing said stratified charge; and, an ignition source communicating with said combustion chamber, with said ball shaped kernel engulfing said ignition source so that said fuel is ignitable by said ignition source.

10. An engine according to claim 9 wherein said predetermined droplet size is between about 8 μm and about 10 μm.

11. An engine according to claim 9 wherein said predetermined velocity is between about 9 m/s and about 12.5 m/s along said axis of said fuel injector.

12. An engine according to claim 9 wherein said predetermined initial cone angle is between about 80° and about 100°.

13. An engine according to claim 9 wherein an amount of fuel vaporized into said ball shaped kernel relative to the amount of fuel injected is greater than about 95%.

14. An engine according to claim 9 wherein said ball shaped kernel defines a relatively rich region and the remainder of the volume of the combustion chamber defines a lean region and wherein an amount of fuel penetrating into said lean region is less than about 17%.

15. An engine according to claim 9 further comprising an engine controller, with said engine controller being responsive to a plurality of engine operating parameters, with said controller causing a switch between a stratified charge and a homogeneous charge formed within the combustion chamber, with said switch occurring at an engine load of greater than about 50% of full engine load.

16. An engine according to claim 15 wherein said switch occurs at an engine load between about 60% and about 70% of full engine load.

17. A stratified charge, direct injection, spark ignition internal combustion engine comprising:

a cylinder block;

a cylinder bore formed in said cylinder block, with said bore defining a longitudinal axis and having a top end;

a cylinder head attached to said block and closing said top end of said bore to form a combustion chamber;

an intake port formed in said cylinder head and communicating with said combustion chamber via an intake valve for inducting air into said combustion chamber;

a fuel injector, defining an axis, for injecting fuel directly into said combustion chamber, with said injected fuel having an injection velocity along said injector axis between about 9 m/s and about 12.5 m/s, a predetermined droplet size between about 8 µm and about 10 µm, and formed into a hollow cone having a initial cone angle between about 80° and about 100°, with said injected fuel thereby shallowly penetrating into said combustion chamber so as to float therein to reduce wall wetting;

a substantially flat top piston reciprocally housed within a said bore, with said substantially flat top piston causing said injected fuel to form into a substantially ball shaped kernel during a compression stroke of the engine, with said fuel remaining substantially unmixed with said inducted air, thereby producing said stratified charge; and an ignition source communicating with said combustion chamber, with said ball shaped kernel engulfing said ignition source so that said fuel is ignitable by said ignition source.

18. An engine according to claim 17 wherein an amount of fuel vaporized into said ball shaped kernel relative to the amount of fuel injected is greater than about 95%.

19. An engine according to claim 17 wherein said ball shaped kernel defines a relatively rich region and the remainder of the volume of the combustion chamber defines a lean region and wherein an amount of fuel penetrating into said lean region is less than about 17%.

20. An engine according to claim 17 further comprising an engine controller, with said engine controller being responsive to a plurality of engine operating parameters, with said controller causing a switch between a stratified charge and a homogeneous charge formed within said combustion chamber, with said switch occurring at an engine load between about 60% and about 70% of full engine load.

21. A stratified charge, direct injection, spark ignition internal combustion engine comprising:

a cylinder block;

a cylinder bore formed in said cylinder block, with said bore defining a longitudinal axis and having a top end;

a cylinder head attached to said block and closing said top end of said bore to form a combustion chamber, the combustion chamber being substantially symmetrical volumetrically about a first plane having a line coincident with said axis lying therein, the combustion chamber being substantially symmetrical volumetrically about a second plane intersecting the first plane at a right angle and having said line lying therein;

an intake port formed in said cylinder head and communicating with said combustion chamber via an intake valve for inducting air into said combustion chamber;

a fuel injector, defining an axis, for injecting fuel directly into said combustion chamber, with said injected fuel having a predetermined velocity, a predetermined droplet size, and formed into a hollow cone having a predetermined initial cone angle, with said injected fuel thereby shallowly penetrating into said combustion chamber so as to float therein to reduce wall wetting;

a substantially flat top piston reciprocally housed within a said bore, with said substantially flat top piston causing said injected fuel to form into a substantially ball shaped kernel during a compression stroke of the engine, with said fuel remaining substantially unmixed with said inducted air, thereby producing said stratified charge; and an ignition source communicating with said combustion chamber, with said ball shaped kernel engulfing said ignition source so that said fuel is ignitable by said ignition source.

22. An engine according to claim 21 wherein said predetermined droplet size is between about 8 µm and about 10 µm.

23. An engine according to claim 21 wherein said predetermined velocity is between about 9 m/s and about 12.5 m/s along said axis of said fuel injector.

24. An engine according to claim 21 wherein said predetermined initial cone angle is between about 80° and about 100°.

25. An engine according to claim 21 wherein an amount of fuel vaporized into said ball shaped kernel relative to the amount of fuel injected is greater than about 95%.

26. An engine according to claim 21 wherein said ball shaped kernel defines a relatively rich region and the remainder of the volume of the combustion chamber defines a lean region and wherein an amount of fuel penetrating into said lean region is less than about 17%.

27. An engine according to claim 21 further comprising an engine controller, with said engine controller being responsive to a plurality of engine operating parameters, with said controller causing a switch between a stratified charge and a homogeneous charge formed within the combustion chamber, with said switch occurring at an engine load of greater than about 50% of full engine load.

28. An engine according to claim 27 wherein said switch occurs at an engine load between about 60% and about 70% of full engine load.

* * * * *